US008285757B2

(12) United States Patent
Xi et al.

(10) Patent No.: US 8,285,757 B2
(45) Date of Patent: Oct. 9, 2012

(54) FILE SYSTEM FOR A STORAGE DEVICE, METHODS OF ALLOCATING STORAGE, SEARCHING DATA AND OPTIMISING PERFORMANCE OF A STORAGE DEVICE FILE SYSTEM

(75) Inventors: Weiya Xi, Singapore (SG); Wei Khing For, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 501 days.

(21) Appl. No.: 11/700,105

(22) Filed: Jan. 31, 2007

(65) Prior Publication Data
US 2008/0183777 A1 Jul. 31, 2008

(51) Int. Cl.
G06F 17/30 (2006.01)
(52) U.S. Cl. ........................................ 707/821
(58) Field of Classification Search .............. 707/205, 707/821
See application file for complete search history.

(56) References Cited

U.S. PATENT DOCUMENTS

| | | | | |
|---|---|---|---|---|
| 5,630,093 | A * | 5/1997 | Holzhammer et al. | 711/115 |
| 5,634,050 | A * | 5/1997 | Krueger et al. | 1/1 |
| 5,864,679 | A * | 1/1999 | Kanai et al. | 709/238 |
| 5,898,868 | A * | 4/1999 | Krueger et al. | 714/2 |
| 6,058,267 | A * | 5/2000 | Kanai et al. | 712/28 |
| 6,256,642 | B1 * | 7/2001 | Krueger et al. | 1/1 |
| 6,865,431 | B1 * | 3/2005 | Hirota et al. | 700/94 |
| 6,910,054 | B1 * | 6/2005 | Herbst et al. | 1/1 |
| 7,034,961 | B2 * | 4/2006 | Moriura et al. | 358/1.9 |
| 7,596,698 | B2 * | 9/2009 | Hirota et al. | 713/172 |
| 7,826,793 | B2 * | 11/2010 | Hong et al. | 455/3.06 |
| 2002/0041384 | A1 * | 4/2002 | Moriura et al. | 358/1.9 |
| 2005/0033911 | A1 * | 2/2005 | Kitamura et al. | 711/111 |
| 2005/0192686 | A1 * | 9/2005 | Hirota et al. | 700/94 |
| 2006/0077724 | A1 * | 4/2006 | Chikusa et al. | 365/189.05 |
| 2007/0022148 | A1 * | 1/2007 | Akers et al. | 707/205 |

OTHER PUBLICATIONS

A. Sweeney, D. Doucette, W. Hu, C. Anderson, M. Nishimoto, and G. Peck. Scalability in the xfs file system. In Proceedings of the 1996 USENIX Technical Conference, pages pp. 1-14, 1996.
B. L. Worthington, G. Ganger, Y. N. Patt, and J. Wilkes. Online extraction of SCSI disk drive parameters. In Proceedings of the ACM Sigmetrics, pages pp. 146-156, 1995.
D. Roselli, J. Lorch, and T. Anderson. A comparison of file system workloads. In Proceedings of the 2000 USENIX Technical Conference, pages pp. 41-54, 2000.
F. Wang, S. A. Brandt, E. L. Miller, and D. D. E. Long. Obfs: A file system for object-based storage devices. In Proceedings of 21st IEEE / 12th NASA Goddard Conference on Mass Storage Systems and Technologies, 2004.
G.R. Ganger and M. F. Kaashoek. Embedded inodes and explicit groupings: Exploiting disk bandwidth for small files. In Proceedings of the 1997 USENIX Technical Conference, pages pp. 1-17, 1997.

(Continued)

Primary Examiner — Sheree Brown
(74) Attorney, Agent, or Firm — Davidson Berquist Jackson & Gowdey, LLP

(57) ABSTRACT

A file system for a storage device including a storage region, capable of storing one or more blocks of data; and a first data structure representing free space in the storage region, the first data structure comprising a location and a length of a block of free space in the storage region is disclosed. Methods of allocating storage, searching data and optimizing performance of the storage device file system are also disclosed.

13 Claims, 15 Drawing Sheets

OTHER PUBLICATIONS

G. R. Ganger. System-oriented evaluation of i/o subsystem performance. PhD dissertation, 1995.

H. C. K. and C. R. H. An application of a context-aware file system. Pervasive Ubiquitous Computing, pages pp. 339-352, 2003.

L. M. McVoy and S. R. Kleiman. Extent-like performance from a UNIX file system. In Proceedings of the 1991 USENIX Technical Conference, pages pp. 33-44, 1991.

M. Mesnier, G. R. Ganger, and E. Riedel. Object-based storage. IEEE Communications Magazine, vol. 41:pp. 84-90, 2003.

N. Talagala, R. Arpaci-Dusseau, and D. Patterson. Microbenchmark-based extraction of local and global disk characteristics. Technical Reports CSD-99/1063, University of California, Berkeley, 1999.

Object-based storage: The next wave of storage technology and devices. Intel White Paper. Copyright 2003.

R. Card, T. Ts'o, and S. Tweedie. Design and implementation of the second extended filesystem. In Proceedings of the First Dutch International Symposium on Linux, 1994.

S. A. Weil. Leveraging intra-object locality with ebofs. University of California, Santa Cruz, 2004.

S. Khungar and J. Riekki. A context based storage system for mobile computing applications. In Proceedings of Second European Symposium on Ambient Intelligence, pp. 55-58, 2004.

W. Y. Xi, et al. OSDsim—a Simulation and Design Platform of an Object-based Storage Device, NASA/IEEE MSST 2006.

W.K. For, W.Y. Xi. Adaptive Extents-Based File System for Object-Based Storage Devices, NASA/IEEE MSST 2006.

Zhu, C. Wang, W. Xi, and F. Zhu. Sansim—a simulation and design platform of storage area network. In Proceedings of 21st IEEE / 12th NASA Goddard Conference on Mass Storage Systems and Technologies, 2004.

Z. Dimitrijevi, R. Rangaswami, D. Watson, and A. Acharya. Diskbench: User-level Disk Feature Extension Tool. 2004.

* cited by examiner

Figure 13

| No. of regions | Size of data unit (KB) |
|---|---|
| 1 | 4 |
| 2 | 4, 128 |
| 3 | 4, 128, 512 |
| 4 | 4, 128, 512, 2048 |
| 5 | 4, 128, 512, 2048, 8196 |

FILE SYSTEM FOR A STORAGE DEVICE, METHODS OF ALLOCATING STORAGE, SEARCHING DATA AND OPTIMISING PERFORMANCE OF A STORAGE DEVICE FILE SYSTEM

FIELD OF THE INVENTION

The present invention relates to the field of storage devices, and in particular, to a file system for a storage device. It also relates to methods of allocating storage, searching data and optimizing performance of a storage device file system.

BACKGROUND OF THE INVENTION

With recent advances in network technologies such as Gigabit fiber optic networks and the proliferation of wireless technologies (for example Wireless Fidelity (WiFi), Worldwide Interoperability for Microwave Access (WiMax)), data may be accessed in a much shorter time than ever before. As a result, thousands of megabytes of email messages, e-commerce transactions, multimedia files and other data can be generated and uploaded to a network in a day. All of this data must be stored, putting unprecedented pressure on the storage industry to develop a more efficient storage technology in managing and storing network data.

In response to these pressures, the storage industry has already moved away from the old Direct Attached Storage (DAS) architecture to a Network Attached Storage (NAS) architecture and/or Storage Area Network (SAN) architecture for managing data. However, both of the NAS and SAN architectures have well-known limitations, such as those discussed in the publication "Object-based storage: The next wave of storage technology and devices", Intel White Paper and publication "Object-based storage", Mike Mesnier et al., IEEE Communication Magazine, Vol 41, Pages 84 to 90, August 2003. The NAS architecture provides file sharing for heterogeneous network platforms with the use of a file server in handling all the metadata (data that describe data), but the throughput is limited by the file server. SAN architectures overcome some of the limitations of NAS architectures by providing direct access to the storage devices. However, SAN architectures may compromise security for better performance, and may also suffer compatibility drawbacks when attempting file sharing between different platforms. As such, a next generation storage technology termed an Object-Based Storage System, as described in publication "Object-based storage: The next wave of storage technology and devices", Intel White Paper and publication "Object-based storage", Mike Mesnier et al., IEEE Communication Magazine, Vol 41, Pages 84 to 90, August 2003 has been proposed to overcome the deficiencies in NAS and SAN.

The Object-Based Storage System has the advantages of both the SAN and NAS architectures in providing scalable, block based accessing (high performance), and secure object sharing for heterogeneous Operating System networks. Files are treated as objects and stored in object-based storage devices (OSDs). The OSD architecture treats storage neither as blocks nor files, but as objects. For example, an object could be a single database record or table, or the entire database itself. An object may contain a file, or just a portion of a file. Like other general storage systems, the OSD has its own file system—an object-based storage device file system (OS-DFS) that handles storage of objects. A good file system is not only able to provide high performance and high throughput for the storage system, but it is also able to maintain high utilization of the storage system.

Many object-based storage systems adopt a general purposed file system for the OSD, for example Second Extended File System (ext2) as disclosed in "Design and implementation of the second extended file system", R. Card, T. Ts'o, and S. Tweedie, Proceedings of the First Dutch International Symposium on Linux, 1994 and Third Extended File System (ext3) as disclosed in "Whitepaper: Red Hat's New Journaling File System: ext3", Michael K. Johnson.

Ext2 is one of the two file systems that are included in the standard Linux kernel. The other file system being the First Extended File System (ext). Ext2 has been designed and implemented to fix some problems present in the First Extended File System (ext). In addition to the standard Unix features, ext2 supports some extensions which are not usually present in Unix file systems. The ext3 file system is a set of incremental enhancements to the ext2 file system that provide other advantages.

However, the workloads encountered by the OSDs are quite different from the general purposed file system workload. As such, the design of the object-based file system may be essential in improving the performance of the overall large-scale object-based storage system.

New designs and methods have been proposed to improve the performance of object-based file systems. In the publication "OBFS: A File System for Object-based Storage Devices", Feng Wang et al., 21st IEEE/12th NASA Goddard Conference on Mass Storage Systems and Technologies (MSST2004), April 2004, an object-based file system (OBFS) was designed specially to handle OSD workloads. The workloads were categorized into small and large objects. Based on this categorization, the OBFS stored the small objects in a small region consisting of a bitmap area and an onode table where metadata of each object is stored, and the large objects to a large region, utilizing embedded onodes to reduce the seek time of the hard disk. An onode includes a size of an object on disk, an object size and an o_block array where locations of data are stored. However, the OBFS described in this reference adopted a synchronous update scheme for writing small workloads or data, which involved a seek time to the onode table. In addition, reading data also involved a seeking distance for the hard disk to read from the onode table and then to the data area. Therefore, each data access involved a seek to the onode table and then to the data area, resulting in relatively slow reading of data.

In the publication "Leveraging Intra-object Locality with EBOFS", Sage A. Weil, University of California, Santa Cruz, an extent-based object file system (EBOFS) which utilized extents as the allocation unit and B+ tree as the tree list in maintaining an object free list as well as an object lookup table is described. To reduce the hard disk's seeking overhead, EBOFS groups the free extents into a series of buckets based on the free extent size. However, the grouping of extents in the free list is a design concern in EBOFS, since a poor grouping decision will degrade performance.

Therefore, there is still a need for an alternative design for an object-based storage device file system, and methods of allocating storage, searching data and optimizing performance of an object-based storage device file system to improve performance of the object-based file systems so as to achieve a high throughout and high disk utilization.

SUMMARY OF THE INVENTION

In one embodiment of the invention, a file system for a storage device is provided including a storage region, capable of storing one or more blocks of data and a first data structure representing free space in the storage region, the first data structure comprising a location and a length of a block of free space in the storage region.

In another embodiment of the invention, a file system for a storage device is provided including a storage region, capable of storing one or more blocks of data and a first data structure representing a variable-sized file stored in the storage region, the first data structure comprising embedded metadata for searching the storage region wherein the embedded metadata comprises a size of the file stored in the storage region and a storage region type that the file reside in.

In another embodiment of the invention, a method of allocating storage in a storage device file system is provided. The method includes determining a size of a file to be written; determining a storage region in the file system, the storage region accepting data written in blocks of a predetermined size, the storage region selected according to the predetermined size, the size of the file, and a performance parameter; locating free space within the determined storage region; and writing data from the file to the free space.

In another embodiment of the invention, a method of searching data in a storage device file system is provided. The method includes embedding metadata of a file in a data structure representing a variable-sized file stored in the file system; determining location of the file in the file system from the data structure wherein the embedded metadata comprises a size of the file stored in the storage region and a storage region type that the file reside in.

In another embodiment of the invention, a method of optimizing performance of a storage device file system is provided. The method includes providing a storage system having regions in which data are stored, each region being associated with a region type; determining a plurality of configurations, each configuration comprising one or more region types; receiving a request for the storage system; simulating the request on the plurality of configurations to determine a plurality of simulated performance results; selecting a configuration based on the plurality of simulated performance results; and reconfiguring the storage system to use the region types of the selected configuration.

The following figures illustrate various exemplary embodiments of the present invention. However, it should be noted that the present invention is not limited to the exemplary embodiments illustrated in the following figures.

BRIEF DESCRIPTION OF THE DRAWINGS

FIG. 13 shows different types of region settings for testing performance of the object-based storage device file system according to an embodiment of the present invention;

DETAILED DESCRIPTION OF THE INVENTION

Exemplary embodiments of a storage device file system and methods of allocating storage, searching data and optimizing performance of a storage device file system are described in detail below with reference to the accompanying figures. In addition, the exemplary embodiments described below can be modified in various aspects without changing the essence of the invention.

Figure 1A:
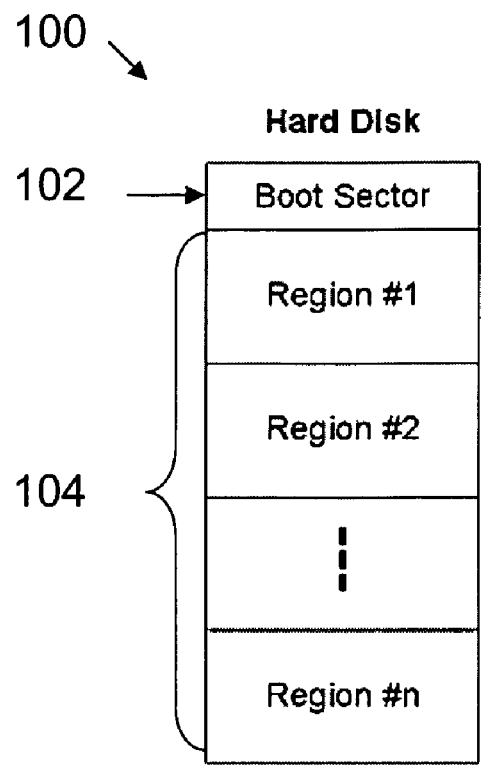
FIG. 1A shows an object-based storage device file system architecture and FIG. 1B shows a structure of a storage region in the object-based storage device file system according to an embodiment of the present invention.

FIG. 1A shows an object-based storage device file system (OSDFS) architecture. In an OSDFS architecture, files are treated as objects and stored in object-based storage devices (OSDs) 100. In each of the OSD 100, there is a boot sector 102 and a plurality of storage regions 104. In the boot sector 102, storage region size, number of storage regions, initialized region ID, number of free regions, number of different types of region and pointer to the free storage regions are recorded. Each of the storage regions 104 may be of the same size, for example 256 MB, but not so limited. This provides for ease of management of the OSD 100 and allows for an option of providing multiple variable sizes of data storage blocks in each storage region 104 of the OSD 100.

Figure 1B:
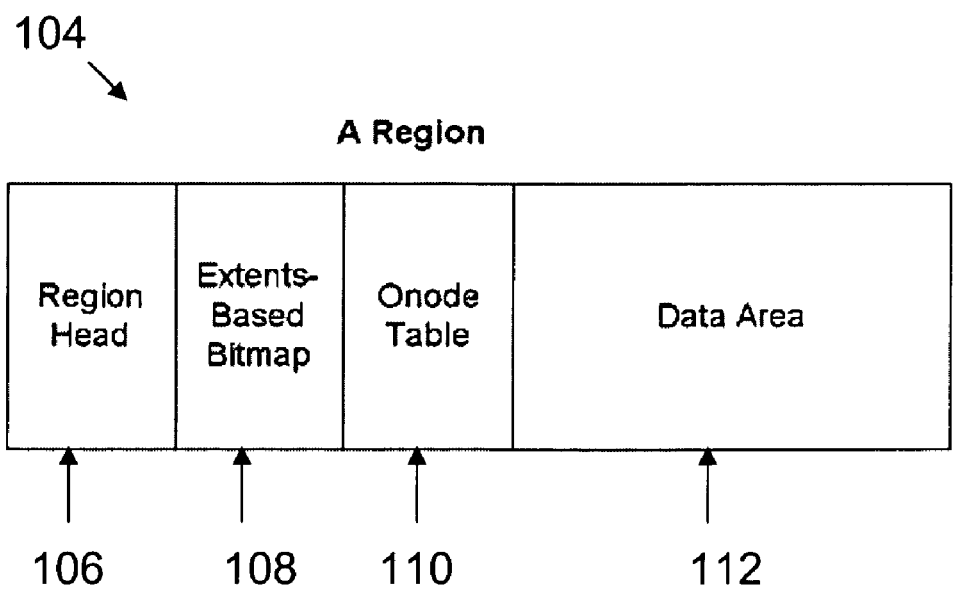

FIG. 1B shows a structure of a storage region in the object-based storage device file system. In each storage region 104, there is one region head 106 where information about the storage region 104, such as region ID, free onodes, starting address of an onode table and starting address of a data area of each of the storage regions 104 are stored. Additionally, in each storage region 104, there is also a data structure representing free space in the storage region 104 or an extents-based bitmap area 108 for free space management, an onode table 110 where metadata of the data in that storage region 104 are recorded, and a data area 112. The extents-based bitmap area 108 and the onode table 110 can be designed to accommodate the maximum number of files or objects in each storage region 104.

In the OSDFS, each of the storage regions 104 can be configured into data storage blocks of the same size. However, different storage regions 104 may have different sizes of data storage blocks, for example storage blocks may be 0.5 KB, 1 KB, 2 KB, 4 KB, 8 KB, 16 KB, 32 KB, 64 KB, 128 KB, 256 KB, 512 KB, 1024 KB, 2048 KB, 4096 KB, 8192 KB, 16384 KB, or other sizes. A user may be able to configure different sizes of data storage blocks based on the workloads distribution. This feature may be useful for users who know the workloads in advance, so they can configure the file system to perform efficiently, with higher throughputs and higher utilization, especially when the file system encounters fragmentation. In general, the performance of the file system with a smaller size of data storage blocks, for example 4 KB will decrease drastically when fragmentation occurs, as compared to a file system that uses larger sizes of data storage blocks, for example 512 KB. This is because a file system with a smaller size of data storage blocks requires a larger number of fragmented free spaces to store a large data item, while a file system with a larger size of blocks only requires a few fragmented free spaces to hold this data. Hence, a file system with a smaller size of data storage blocks needs to seek to numerous different locations to store the data. As a result, the performance will be degraded. However, a file system with larger sizes of data storage blocks may result in wasted storage space when there are numerous small data items to be stored. With this user configurable feature, the OSDFS can be configured as a general-purpose file system such as ext2, or ext3 when dealing with small sizes of files, while still maintaining high utilization of storage space.

In the OSDFS, the metadata of each of the files are stored in an onode table. The number of onodes and data storage blocks are the same in each storage region 104. An onode includes the size of a file on disk, the file size, and the o_block array, where locations of the data are stored. Each o_block array can store up to 110 data locations in the format of extents (logical block number (lbn), size in blocks), of which an extent includes a starting block address and size of a block of free space. The lbn is the index or address for the whole hard disk and it is used in small computer system interface (SCSI) command. For continuous data, only one entry in the o_block array is needed to store the data location. More than one entry in the o_block array is needed when storing the data locations of fragmented files. The o_block array makes use of ext2 direct and indirect pointers to store the data locations if the data locations of a fragmented file exceed the number of available entries in an o_block array. Direct pointer means that the number in the o_block array can be an address of a particular data in a hard disk while indirect pointer means that it can be an address for another o-block array in the onode table. In the OSDFS, each onode may be designed to be 512 bytes, but is not so limited.

Figure 2:
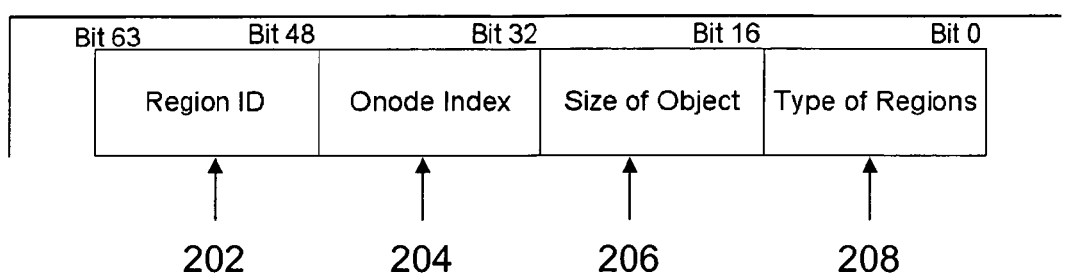
FIG. 2 shows an example structure of an onode ID with embedded-metadata according to an embodiment of the present invention.

An Object-based Storage System includes three main components: an Object Manager (OM), the Object-based Storage Devices (OSDs) 100 and clients. The OM is responsible for managing metadata of the OSDs 100 in the storage system. It also provides authentication when a client wants to access the data in the OSDs 100. The OSD 100 is a device that stores the clients' data. Each of the OSDs 100 includes an object-based file system for managing the free spaces and the stored data. When a client needs access to an OSD 100, it first needs to obtain authentication from the OM. Once this is done, the OM sends the metadata (i.e. object mapping) of the OSD 100 to the client. Finally, with the metadata and authentication, the client can access the OSD 100 directly. An Onode ID is a data structure identifying a particular onode, representing a variable-sized file stored in the storage region 104. It is used in mapping an object ID forwarded from the client. Onode IDs are maintained in a tree list and are used in determining the location of a stored data. FIG. 2 shows an example structure of an onode ID with embedded-metadata. The Onode ID includes a Region ID 202, Onode Index 204, Size of Object 206 and Type of Regions 208, for example 0.5 KB, 1 KB, 2 KB, 4 KB, 8 KB, 16 KB, 32 KB, 64 KB, 128 KB, 256 KB, 512 KB, 1024 KB, 2048 KB, 4096 KB, 8192 KB, 16384 KB or other possible region types. In the OSDFS, the Onode ID is designed to be a 64-bit data structure, but is not so limited. In the example Onode ID shown in FIG. 2, the Type of Regions 208 is positioned from bit 0 to bit 15, the Size of Object 206 is positioned from bit 16 to bit 31, the Onode Index 204 is positioned from bit 32 to bit 47 and the Region ID 202 is positioned from bit 48 to bit 63. The metadata of an object, such as the Type of Regions 208 used to store the object's data and the Size of the Object 206 are embedded in the onode ID. This permits read requests to be handled without having to read the metadata from the onode table, which would involve a seek delay that may decrease the performance of the file system.

Figure 3:
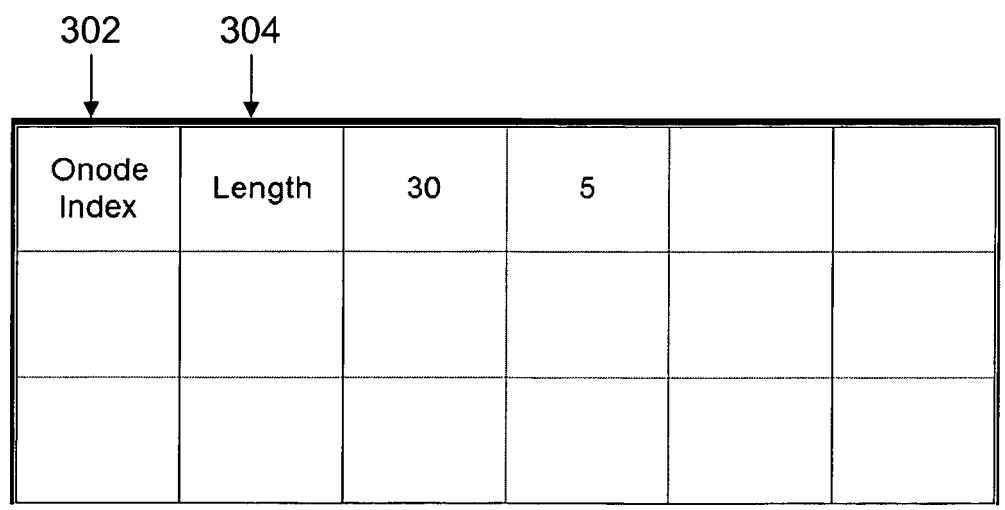
FIG. 3 shows an extents-based bitmap according to an embodiment of the present invention.

Like a traditional file system, OSDFS also has a bitmap area in each storage region 104. The bitmap area is used to mark the unused data storage block. However, unlike conventional bitmap areas, the OSDFS uses extents (index, size) to represent the free spaces in each storage region 104. This not only provides an easy way to maintain a map of the free spaces on a hard disk, but also provides an efficient scheme for searching for continuous free space that can be allocated for storing data. In addition, fragmented files in the OSDFS are greatly reduced as compared to other file systems such as ext2. Tests have shown that the OSDFS only encounters fragmentation when the disk reaches a utilization above 95% (this means writing data to a plain disk until 95% of the disk has been utilized). FIG. 3 shows an extents-based bitmap according to an embodiment of the present invention. The bitmap area includes an array, in which an odd numbered entry in the array records a location of a block of free space or the free onode index 302 in the storage region, while an even numbered entry in the array stores the length or size 304 of a block of free space or number of continuous free spaces in blocks in the storage region. As an example in FIG. 3, the onode index 30 has 5 continuous blocks of free space, this implies that blocks at indexes 30 through 34 are the free spaces.

Figure 4A:
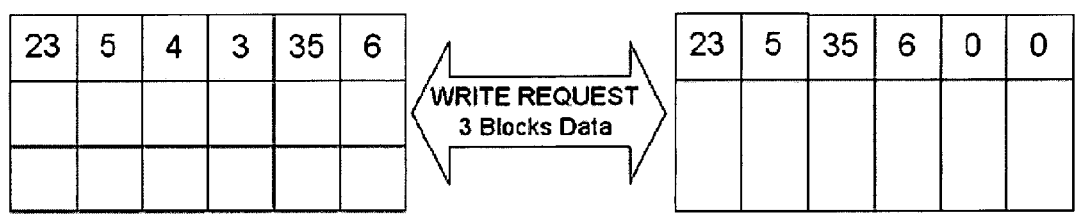
FIG. 4A shows an example bitmap operation when a WRITE request of 3 blocks of data is forwarded to an object-based storage device file system and FIG. 4B shows an example bitmap operation when a WRITE request of 8 blocks of data is forwarded to an object-based storage device file system according to an embodiment of the present invention.
Figure 4B:
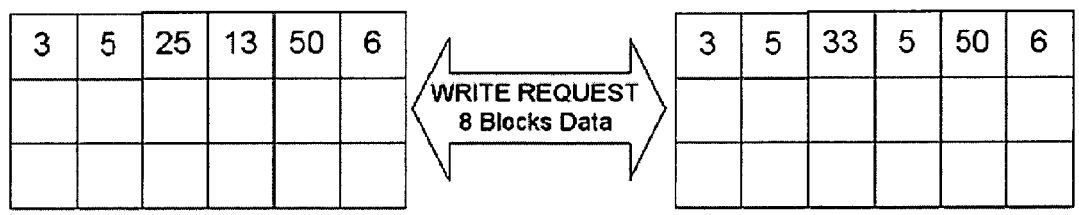

FIG. 4A shows an example bitmap operation when a WRITE request of 3 blocks of data is forwarded to an OSDFS and FIG. 4B shows an example bitmap operation when a WRITE request of 8 blocks of data is forwarded to an OSDFS according to an embodiment of the present invention. In FIG. 4A, when a WRITE request of 3 blocks of data is forwarded to the OSDFS, the OSDFS scans the bitmap array to find the exact match of the continuous free space required by the object. If there is an exact match, the data is written and the bitmap is updated. If there is no exact match between the continuous free spaces and the data size, OSDFS will allocate the data to an area that has a larger amount of continuous free space than is needed by the data, as shown in FIG. 4B. In FIG. 4B, the onode index starting at block address 25 runs for 13 blocks of free spaces. The number of free spaces is greater than the 8 blocks needed for writing the data. The data is written and the entry in the bitmap is updated to remove the 8 blocks of free spaces needed for writing the data. Therefore the resultant blocks of free spaces now starts at block address 33 and runs for 5 blocks of free spaces.

Figure 5A:
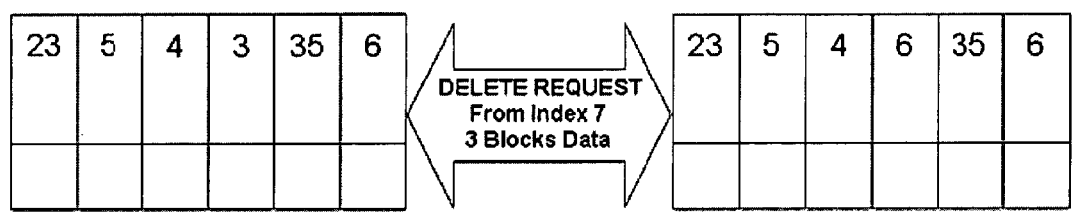
FIG. 5A shows an example bitmap operation when a DELETE request of 3 blocks of data from index "7" is forwarded to object-based storage device file system and FIG. 5B shows an example bitmap operation when a DELETE request of 8 blocks of data from index "10" is forwarded to object-based storage device file system according to an embodiment of the present invention.
Figure 5B:
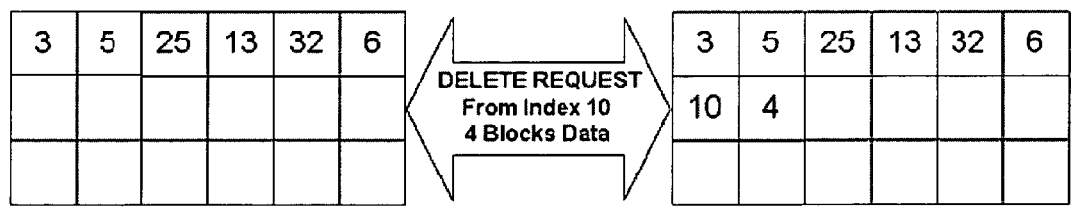

FIG. 5A shows an example bitmap operation when a DELETE request of 3 blocks of data from index "7" is forwarded to the OSDFS and FIG. 5B shows an example bitmap operation when a DELETE request of 8 blocks of data from index "10" is forwarded to the OSDFS according to an embodiment of the present invention. In FIG. 5A, when a DELETE request of 3 blocks of data from index "7" is forwarded to the OSDFS, the OSDFS first scans the bitmap area to determine whether any of the entries in the bitmap area can be merged with the deleted area to form a continuous free space. If that cannot be done, the OSDFS will create a new entry in the bitmap array to map the free space created by the delete request, as shown in FIG. 5B.

Figure 6:
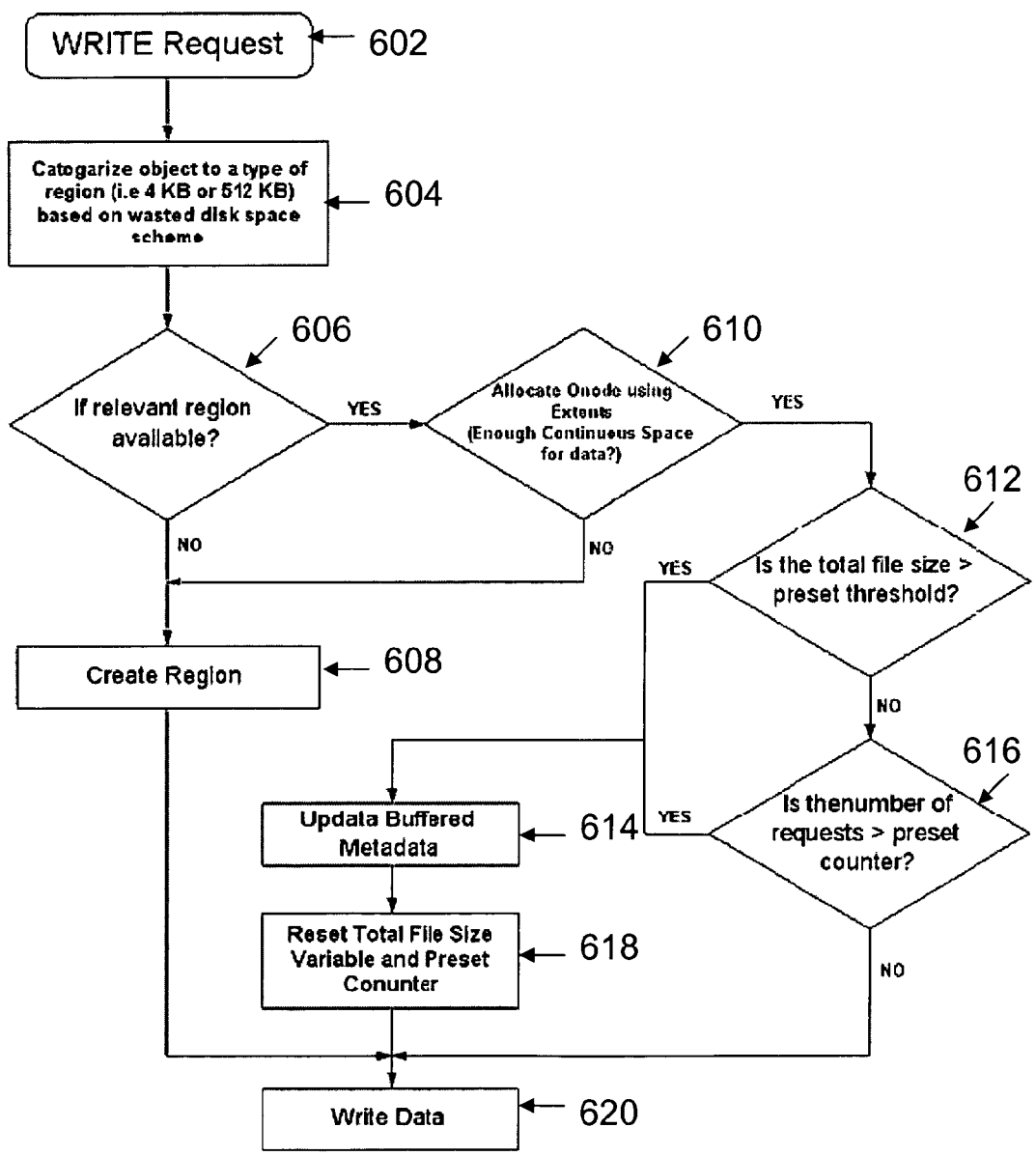
FIG. 6 shows a flow diagram for a WRITE operation according to an embodiment of the present invention.

In addition to an efficient file system structure, a good storage allocation strategy is crucial in designing a high throughput storage system. The OSDFS uses at least the following strategies for allocating storage to provide a high throughput storage system: (1) a data allocation method based on wasted disk space; (2) an adaptive scheme for updating metadata; and (3) an extents-based bitmap for searching for continuous free space. FIG. 6 shows a flow diagram for a WRITE operation taking these strategies into account to provide a high throughput storage system according to an embodiment of the present invention. When a WRITE request is forwarded to the file system in step 602, the file system decides which storage region is suitable for the incoming WRITE request based on a wasted disk space allocation strategy in step 604. In step 606, after the storage region has been selected, a check is made to determine whether there is such an initialized storage region. If the OSDFS does not find such a storage region, the file system will initialize one of the free storage regions to allocate the data in step 608. If there is such a storage region, the file system will first look for the continuous free spaces from the extent-based bitmap to allocate the data in step 610. If the continuous free spaces are not large enough to contain the data, the file system will create a new storage region to store the data in step 608. When there is a lack of uninitialized free storage region, the file system will allocate the data to the old initialized storage region and search for the continuous free spaces to allocate the data. In the OSDFS, fragmentation occurs when the disk is almost full.

The wasted disk space allocation strategy involves allocating data to different storage regions based on their wasted disk space in the OSDFS. For example: consider a disk with two different types of regions, regions having 4 KB blocks and regions having 512 KB blocks. When a write request requires a size larger than 508 KB but smaller than 512 KB, the OSDFS will allocate the data to a block in a 512 KB region instead of a 4 KB region. This is because 128 blocks will be required if the 4 KB region is chosen and the wasted free space will be less than 4 KB. If the data is allocated to the 512 KB region, the wasted memory is also less than 4 KB. As a result, allocation of the data to the 512 KB region is preferred as only one block is involved in the 512 KB region as compared to 128 continuous blocks in the 4 KB region. Moreover, allocation of data to the larger block-size region can provide a higher throughput as compared to that for the smaller block-size region when the file system encounters fragmentation.

In order to enhance the performance of the file system while minimizing the possible loss of data in the event of an unexpected system crash or power failure, the OSDFS uses an adaptive metadata updating scheme in writing metadata to the onode. The OSDFS updates the metadata to the onode based on either the total size of the files it has encountered or the number of write requests it has completed in a type of storage region. The metadata is being buffered before either of the conditions is satisfied. If the total size of the files exceeds a certain threshold (e.g., 100 MB) in step 612, the OSDFS will update all the previous buffered metadata in step 614. On the other hand, if the number of write requests it has encountered exceeds a preset counter in step 616, OSDFS will also update the onodes which reside in its buffer in step 614 even though the total size of the files is less than the threshold. For example, if the preset counter is set to 10 requests, the OSDFS will update the previous 9 requests' metadata and the current request's metadata when the OSDFS is dealing with the 10th request. After updating of the metadata, the total file size variable and the present counter of the number of write requests is reset in step 618. Thereafter, data is being written into the OSDFS in step 620. This adaptive scheme provides a higher throughput than the synchronous updating scheme where the file system has to update the metadata (in an onode table) while writing the data to the hard disk.

Figure 7:
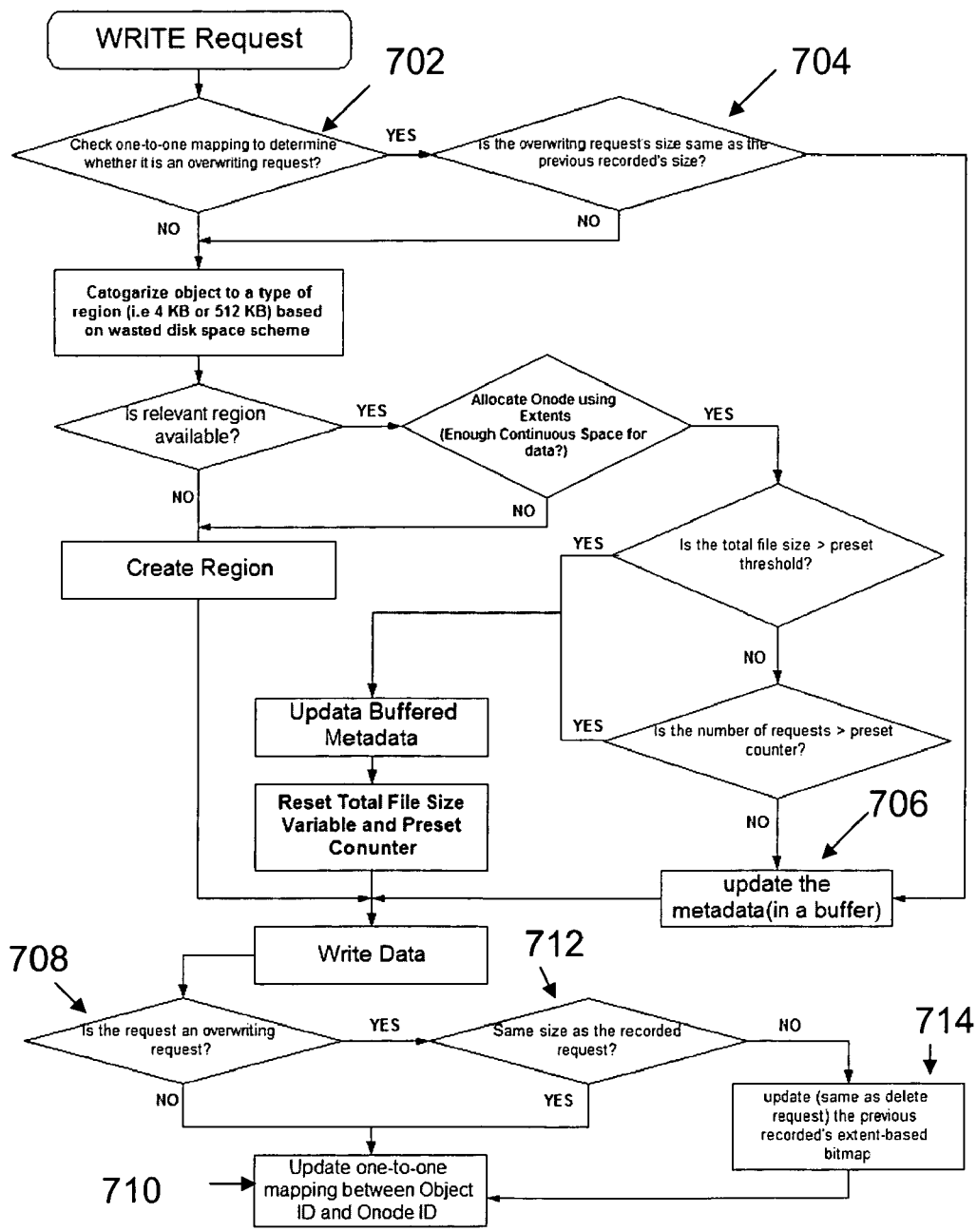
FIG. 7 shows a flow diagram for a WRITE operation taking into consideration the case of random data according to an embodiment of the present invention.

For the adaptive scheme for metadata updating as disclosed in FIG. 6, every request is taken to have a unique Object ID. However, for the case of random data, there is a need to implement an extra coding before any write operation is performed because not every write request has a unique object ID and there may be a repetition of the object IDs. FIG. 7 shows a flow diagram for a WRITE operation taking into consideration the case of random data according to an embodiment of the present invention. For an example of random data, consider the case where the writing sequence of the random data is as follow: Object ID 1, Object ID 2, Object ID 3, and Object ID 1 again. For the first 3 write requests, the write process can be carried out as described in FIG. 6. However, for the 4th request, there is a need to check the mapping of the Object ID and the Onode ID to determine if the write request is an overwriting request as in step 702. The mapping between the Object ID and the Onode ID is a one-to-one mapping and it is constructed in an AVL tree form. An AVL tree is a self-balancing binary search tree used for searching. In an AVL tree the heights of two child subtrees of any node differ by at most one, therefore it is also called height-balanced. Lookup, insertion, and deletion all take O (log n) time in both the average and worst cases. Additions and deletions may require the tree to be rebalanced by one or more tree rotations. AVL tree may be used because of its simple implementation; however other forms of trees, for example B+ tree can also be used. The one-to-one mapping is updated after every write request or delete request and is stored in a memory and ready to send to the server after a certain period. If the Object ID is in the AVL tree, it means the incoming request is an overwriting request. From the Onode ID with embedded metadata which reside in the AVL tree, the region ID, Onode Index, size of the object, and the region type of the object can be extracted. As the metadata (4th request) has not been updated, the onodes (metadata) such as lbn, size, and Onode Index are still in the memory. By matching the Onode Index from the Onode ID and the Onode index from the onodes, the corresponding metadata can be updated after the new data is updated.

If the write request is not an overwriting request, the write process can be carried out as described in FIG. 6. However, if the write request is an overwriting request, there is a further need to compare the size of the overwriting request (4th request) with the previously recorded data (1st request) in step 704. If the size of the overwriting request is not the same as the recorded data, the write process can also be carried out as described in FIG. 6. However, if the size of the overwriting request is the same as the recorded data, then the same Onode ID can be kept and the metadata is updated in a buffer in step 706.

After writing the data, there is a need to update the previously recorded data (1st request) with the new data (4th request). Firstly, there is a need to check the mapping of the Object ID and the Onode ID again to determine if the write request is indeed an overwriting request in step 708. If the write request is not an overwriting request, then the one-to-one mapping between the Object ID and the Onode ID is carried out in step 710. However, if the write request is an overwriting request, there is a further need to compare the size of the overwriting request (4th request) with the previously recorded data (1st request) in step 712. If the overwriting data is of the same size (size on disk) as the previous recorded data, then the one-to-one mapping between the Object ID and the Onode ID is carried out in step 710.

However, for an overwriting request size that is smaller or larger than the previous recorded size, there is a need to allocate new space, as with a normal write request, to maintain the continuity of an object in the file system. As a result there is a new Onode ID and new metadata. Before updating the new Onode ID to the AVL tree and updating the metadata to the corresponding metadata buffer, the previous recorded data is deleted in step 714. Since the previous Onode ID is known (Onode Index and size of object), the extent-based bitmap is updated as described previously. Lastly, the new metadata is updated to the metadata buffer and the new Onode ID is updated to the AVL tree in step 710.

Data searching is another component that affects the performance of the file system. Because most of the read requests are random, it is impossible to predict the location of the next data. As such, minimizing the seek distance may become the main design criteria in providing a high performance file system. In OSDFS, the seeking distance can be minimized when dealing with read requests by using Onode ID with embedded metadata. The Onode ID is designed so that it can accommodate metadata such as the region type and the size of the files. As a result, the location of a file can be determined, for example, using equation (1) as shown below. By designing the Onode ID to include metadata, the OSDFS can avoid reading metadata from the onode and hence improve the read performance.

$$DataLBN = RegData + OIndex * SizeBlk/SecSize \quad \text{Equation (1)}$$

where DataLBN is the starting address of the file,
RegData is the staring address of the data area in a region (the value is determined when the region is initialized),
OIndex is determined from the Onode ID bit 32 to bit 47 (See FIG. 2),
SizeBlk is the number of blocks that can be supported in a region (it depends on the region type—Onode ID bit 0 to bit 15),
SecSize is the size of one sector which is 512 Bytes for example.

Figure 8:
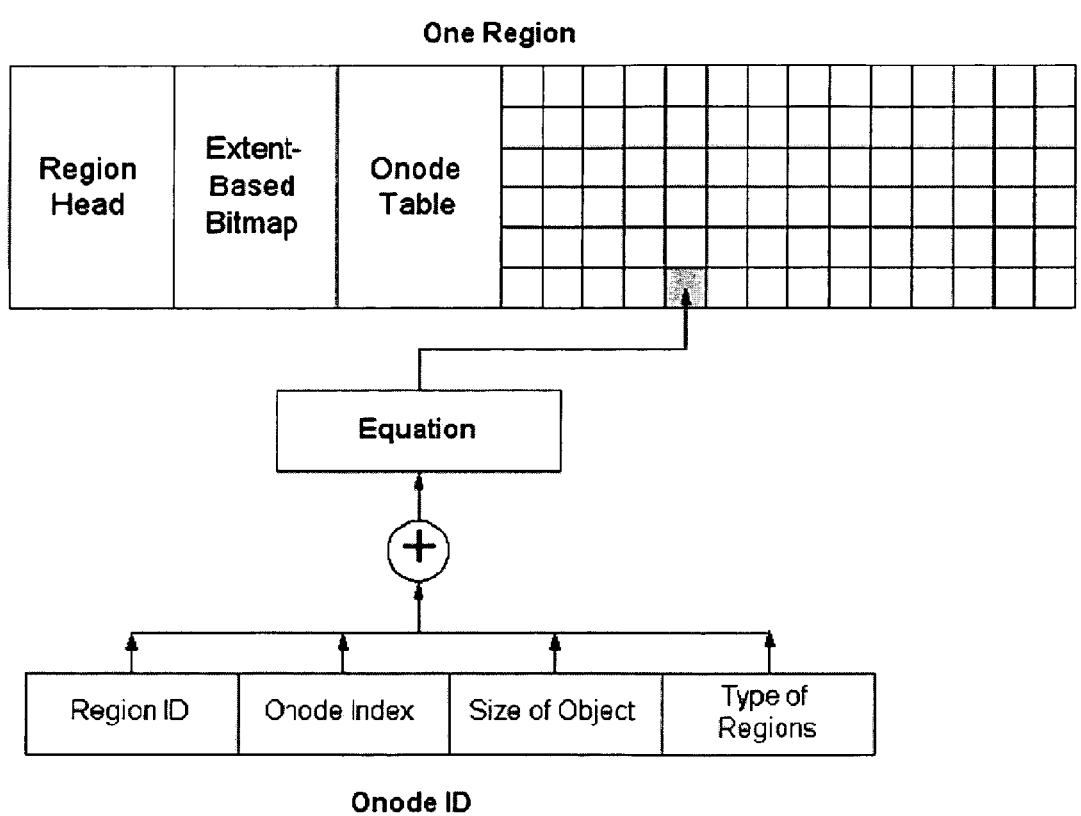
FIG. 8 shows data searching of a continuous object according to an embodiment of the present invention.

FIG. 8 shows data searching of a continuous object according to an embodiment of the present invention. Information about the size of an object can be obtained from the Onode ID. Hence, the data can be read using the information of the staring address of the object and the size of the object. However, this method is typically only applicable to a continuous object.

Figure 9:
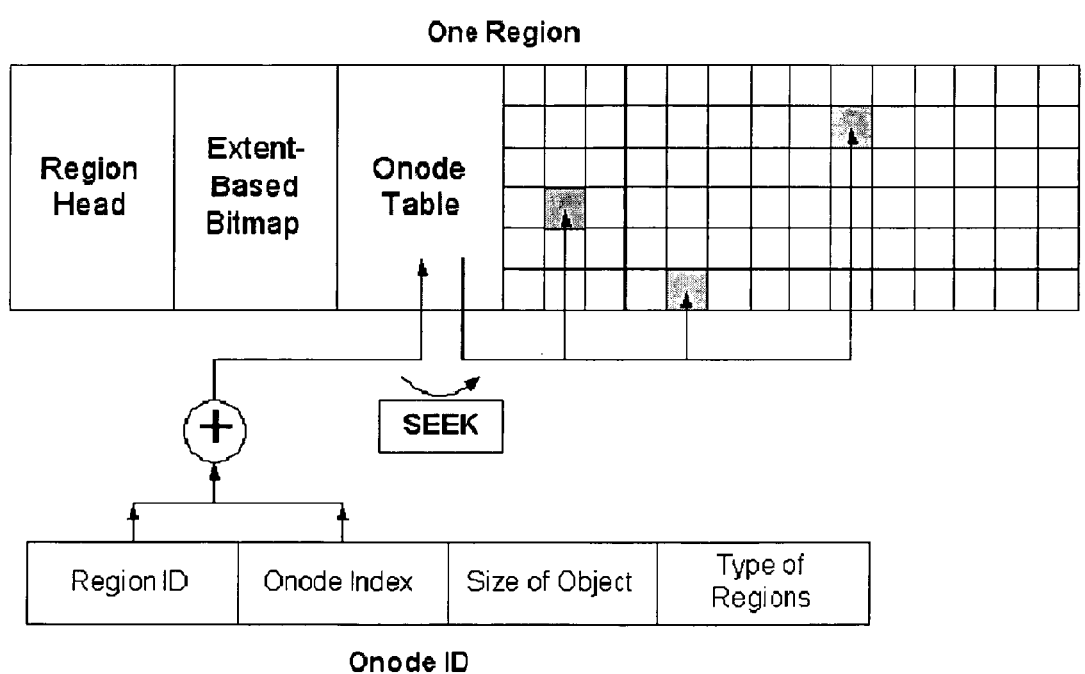
FIG. 9 shows data searching of a fragmented object according to an embodiment of the present invention.

FIG. 9 shows data searching of a fragmented object according to an embodiment of the present invention. For a fragmented object, because the data resides in multiple locations, the entire data cannot be determined by using the above equation (1). In such a case, OSDFS requires loading the metadata from the onode table, which may involve a seeking distance to the onode table when dealing with fragmented files. However, as discussed above, because extents are used in allocating continuous free space, the file system may seldom encounter fragmented objects.

The performance of the OSDFS may be enhanced by an optimization strategy for fast continuous data allocation, data search and update. It would also be preferable to allow the user to define a virtually unlimited number of different types of regions or groups in a file system. This can cater well to heterogeneous workload applications. There are two parts to the optimization strategy, the first part involves an approach to achieve good performance for an initial system setup and the second part allows for the data allocation and management strategy to be continuously re-configured to suit changes in the workload pattern.

In the first part of an initial file system setup for a new storage device, the proposed algorithm helps to determine the optimum settings for the groups or regions in order to achieve optimum performance from the data management system. It helps to determine the initial system configuration which will give the best performance for a deterministic workload. The procedure can be done off-line. Once the storage system has been configured using the proposed approach, it will have optimum performance as long as the characteristics of the workload remains unchanged, as will be the case in many environments.

The settings for the groups or regions that work well for a given type of workload may not work as well when the workload changes. A second set of optimizations address this problem and are most applicable in situations, or for environments, in which the characteristics of the workload change significantly over time. The optimizations described below attempt to adaptively change the region or group setting and data allocation algorithms based on the most recent measured workload pattern. This can then ensure that the system will always perform near optimally, even when the characteristics of the workload change.

Figure 10:
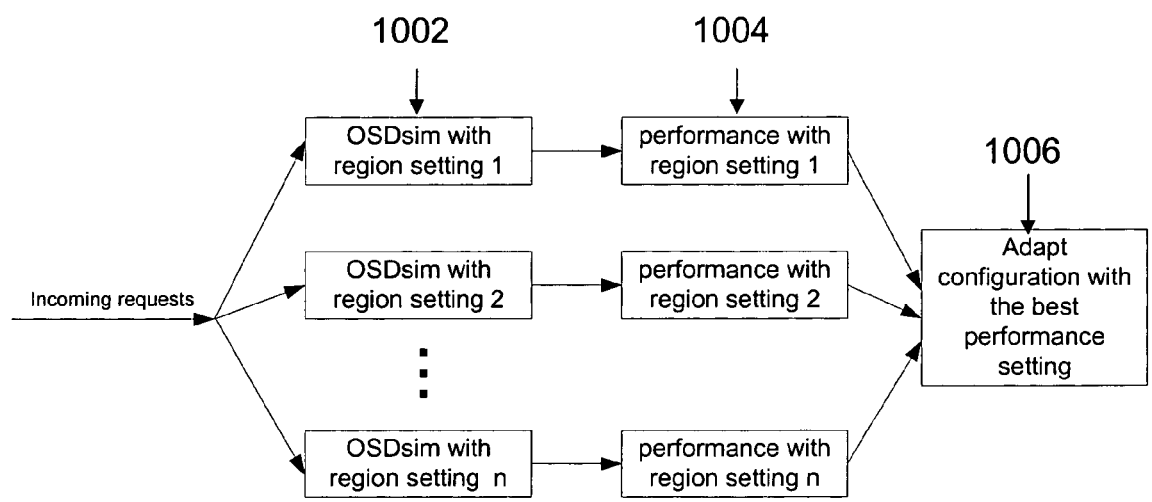
FIG. 10 shows an off-line procedure for determination of an optimum initial configuration for a new storage system according to an embodiment of the present invention.

FIG. 10 shows an off-line procedure for determination of an optimum initial configuration for a new storage system according to an embodiment of the present invention.

To accomplish the off-line determination of the initial configuration and settings needed for optimum performance of a new storage system, a simulator for an OSD system, such as is described in the publication "OSDsim—a Simulation and Design Platform of an Object-based Storage Device", Xi Wei Ya et al., NASA/IEEE MSST 2006, incorporated herein by reference may be used. The simulator includes two main parts, the first part for simulation of the OSDFS and the second part for simulation of the disk driver.

As illustrated in FIG. 10, using an actual system workload trace, simulation of the storage system with a particular group or region setting is performed in step 1002. This process is repeated with n different group or region setting where n is a user-selected number. After the simulations for the different group or region settings, the performance for the respective group or region setting is computed in step 1004. The setting with the best performance is then selected and used for the initial configuration of the new storage system in step 1006. The system should then have the best possible performance for the type of workload that is used in the simulations. If an actual workload trace is not available, then a simulated trace using the characteristics of the workload patterns that the storage system is required to handle can be used.

Some further details of the simulations and the determination of best performance are listed below:
1) If an actual system workload trace can be obtained which is typical of the workload that the storage system is expected to handle, this will give the best result. If this is not available, then a simulated synthetic workload trace can be generated using certain statistical characteristics of the workload that is expected to be handled. Once the best group or region setting has been determined, the storage system should give the best performance as long as the characteristics of the workload that it handles remain the same.

2) A High Throughput parameter, β where 0≦β≦1, is defined which gives the desired relative importance of system throughput as compared with disk space utilization. The two extreme cases are when β=0 and β=1. With β=1, the desired performance of the storage system is determined entirely in terms of system throughput with disk space utilization not a consideration at all. With β=0, the desired performance is entirely based on disk space utilization with system throughput not important at all. B is set in advance depending upon the desired trade-off between system throughput and disk space utilization.

3) T is defined as the average throughput of the system in the unit of MB per second 4) U is defined as the storage space utilization in % and given by $$U = \frac{\text{Total size of the data}}{\text{Total storage space occupied}} * 100 \qquad \text{Equation (2)}$$

The performance of the file system can be computed by the following equation.

$$P = \beta * T + k * (1-\beta) * U \qquad \text{Equation (3)}$$

where k is a constant used to account for the effect of units used in defining the parameters T and U.

With a predefined β, the file system group or region setting with the highest performance as given by P in equation (3) is then chosen.

There are four main steps involved in determining the optimum system configuration and data allocation algorithm which are described as follow.

1. Collect the system workload trace for the environment the storage system will be used on over a suitable period of time, e.g. a day or a week.
2. Choose the n types of group or region settings to be applied.
3. For the first type of group or region setting, apply the workload trace and determine the performance. Record the setting and the corresponding performance.
4. Repeat Step 3 above for each of the n types of selected group/region settings.
5. Select the group or region setting which gave the best performance and set up the new storage system using this.

With the abovementioned settings, the storage system should achieve very good performance as long as the statistical characteristics of the pattern of the workload remain the same. In the event that the workload pattern changes, then system performance may deteriorate.

To maintain near-optimum storage system performance during operation even when the statistical characteristics of the workload changes, an approach that adaptively adjusts the settings of the groups or region based on measured parameters of the workload being handled may be used in accordance with an embodiment of the invention.

File systems normally do not adapt their data allocation strategies when the workload pattern being handled is changed. The data allocation and management strategy used in a file system is normally designed such that it is optimized for a certain pattern of workload and system performance will deteriorate when the pattern of workload changes. For example, ext2 performs well for small requests and is thus suitable for applications which contain many small requests. Its performance, however, deteriorates for workloads containing a large number of large requests.

In accordance with an embodiment of the invention, an approach has been designed such that the data allocation and management strategy is continuously re-configured to suit the workload pattern and changes when the workload pattern changes. This re-configuration is achieved by changing the setting of the region or group types used for disk data management and data allocation strategies. With different region type settings and data allocation algorithms, the OSDFS, or any other type of file system using the group or region to manage the data, can provide near optimum performance for different workload patterns. For example, for small requests of 4 KB size, the best performance is obtained with a region setting of 4 KB. The same goes for requests for other sizes such as 1 MB and 10 MB. This invention pertains to how the system can be made to adapt to changing workloads by finding the optimal region type settings and data allocation algorithms for the OSDFS, or any other file system using group or region to manage data, and then re-configuring this dynamically so that the file systems can always provide high performance under different workload environments.

Details of the algorithm are as follows. A parameter termed High Throughput β (HTβ) is defined with the values of β varying from 0 to 1. The value of β gives the relative importance of system throughput as compared to storage space utilization in the desired performance objective. When the value of β=1, the operating strategy used is called HT1. This operating condition is for the situation when the storage space utilization of the storage device is very low and maximizing storage space utilization is not a concern at all. In this case, maximizing the throughput, or minimizing response times, is the only concern. When α=0, the operating strategy used is HT0. This describes the situation when the space utilization has reached a critical value and having sufficient storage space is the only concern. In this case, maximizing space utilization is the only concern with throughput performance having a very low, or no, priority.

For the above two extreme situations, the strategies of allocating the data to the storage devices are as follows. Consider a storage device containing a number, M, of regions or groups. Each of the regions or groups can be either allocated, meaning defined and used for storage of data, or unallocated, or not defined and not used as yet. In the proposed system, these regions or groups will be defined and allocated for data storage as and when the need arises. When a region or group is defined, it will be associated with a data block size, R. The values R can take one of N numbers. Both the values of R and N can be either predetermined, or adaptively adjusted according to the pattern of the incoming workloads. The value of N will be much smaller than the total number, M, of regions or groups available for data storage.

For the HT1 Strategy, the performance objective is to maximize system throughput. For any new incoming WRITE request, the data will be stored in the defined region or group with the smallest data block size R that can store the data in only one block. For example, if there are defined regions or groups with data block sizes of R=32 KB and R=256 KB with nothing in-between and a WRITE request requires a data block of 33 KB to be stored, it will be stored in a defined region or group with R=256 KB. If there is insufficient space in all the defined regions or groups with R=256 KB, new regions or groups of R=256 KB will be created and defined using the remaining free or unallocated regions. In this way, the data will not be fragmented and will only be stored in one block. As such, the time taken to store the data will be the shortest possible and system throughput will be the highest possible. This strategy also, at the same time, causes the most storage space wastage as, for the example given, a 33 KB block of data occupying a space of 256 KB means that the unused space of 256 KB−32 KB=222 KB cannot be allocated for other uses unless the whole block is released.

For the HT0 Strategy, the strategy is employed when storage space utilization is very high and the only concern is to minimize space wastage at the expense of system throughput. In this case, when a WRITE request is received, no matter how large the data that is to be written is, the data will be assigned to any available smallest region or group defined for example R=4 KB. If insufficient space is available in the defined regions with R=4 KB, then new ones will be defined and created from the available remaining free unallocated regions. This will cause data fragmentation leading to lower system throughput. However, the size of any wasted space will be limited to less than 4 KB. In the same example above, the 33 KB request will be allocated to a 4 KB defined region and 9 data blocks used to store the data. In this case, the unused space will only be 9×4−33=3 KB. In the HT0 strategy, system performance in terms of throughput will be the worst but its performance in terms of space utilization will be the best.

Between the two extreme situations of HT1 where disk space utilization is very low and thus storage space is not a concern, and HT0 where disk space utilization is very high and is the only concern, there will be situations in-between which calls for a strategy somewhere in-between the two extremes. Here, we define another parameter, $\alpha$, to indicate the utilization of disk storage space at any point in time. $\alpha$ can be computed using the formula $$\alpha = \frac{\text{no. of defined regions}}{\text{total no. of regions available for use}} \text{ where } 0 \leq \alpha \leq 1 \quad \text{Equation (4)}$$

For a newly installed disk storage system, or when a large amount of additional storage space is installed, the value of $\alpha$ will be very low, indicating that there are still a large number of unallocated regions. With the concern of running low in unused storage space not at all a concern, the HT1 data allocation strategy will be used to give the best system performance in terms of system throughput. As time goes by and the disk space becomes more used with fewer unallocated regions, the value of $\alpha$ will increase and a strategy balancing between having a good system throughput and conserving disk space will be used. Eventually, $\alpha$ will grow to a value closer to 1, at which point minimizing disk space wastage will be the only concern. In this case, the HT0 data allocation strategy will be used. Simulations may be used to determine the best strategies to be used for different range of values of $\alpha$, as it grows from 0 towards 1.

Initially using the HT1 strategy, there will be a lot of data allocated to regions or groups with large data unit size, as in the example mentioned earlier when a 33 KB data request is allocated to the R=256 KB region. As the time goes by and storage space becomes a concern more and more requests will need to be allocated to the regions with smaller block sizes to reduce disk space wastage. In the extreme case with the HT0 Strategy, all data should be allocated only to the regions with the smallest block size, for example R=4 KB. As the value of $\alpha$ change from 0 to 1, the optimum allocation of data to the different regions will need to be different with regions of smaller block size being preferred. In such a situation, the data which had initially been stored in the region or group with larger block sizes can be moved to the region or group with smaller block sizes in order to achieve better space utilization. This data clean up or data movement can be implemented during the periods when the system is not busy or at pre-defined intervals.

Given below is an example of a data allocation and clean up strategy which can work well, better than a static allocation system. Given here is a numerical example to illustrate what has been described above on how the adaptive algorithm works.

Assume
1) There are N=5 different types of defined regions used in the system. Values of the data block size, R, used could be
$R_1$=4K
$R_2$=32K
$R_3$=256K
$R_4$=2048K
$R_5$=16384K
2) The ratio of consecutive data block size $$r_{j-1} = \frac{R_j}{R_{j-1}}$$

for j=2, 3, 4, 5 is the same with $r=r_j=8$ for j=1, 2, 3, 4 in this example.
3) Define a constant f for use in the request allocation strategy. Here we use as an example f=0.05;
4) Define x as the size of the incoming WRITE request, and $x_j$ for j=1, 2, 3, 4, 5 as the size of the requests which should be located to the defined region of $R_1$, $R_2$, $R_3$, $R_4$, and $R_5$ respectively.

The formulas used to allocate the incoming WRITE requests to the 5 different types of defined regions are as follow.
Define i as the integer part of $$\left(\frac{\alpha}{f}\right),$$

where $\alpha$ is the ratio of the number of defined regions to total number of regions available. The value of i will start from 0, and increase as storage space utilization increases.
Then for values of i=0, 1, 2, ..., 6, 7, the following allocation method is used $0 \leq x_j \leq R_{j+1} - R_j*[N-(i+1)]$ for j=1

$R_j - R_{j-1}*[N-(i+1)] \leq x_j \leq R_{j+1} - R_j*[N-(i+1)]$ for j=2, 3, 4

$x_j > R_j - R_{j-1}*[N-(i+1)]$ for j=5

When i=0 it is actually the case of HT1. For i=0, ... 7 all incoming WRITE can be written to all the 5 types of defined regions depending on the request size. The allocation strategy changes as $\alpha$, and thus i, changes.
When i=8 the data will not be allocated to the defined region $R_5$ which is the defined region with the largest data block size as, at this point, the limitation in storage space starts to become a concern. The data which was in the $R_5$ region before can all be moved to the $R_4$ region.
For i=8, the following is used $0 \leq x_j \leq R_{j+1}*r$ for j=1

$R_{j+1} < x_j \leq R_{j+1}*r$ for j=2, 3

$x_j > R_{j+1}$ for j=4

When i=9, the data will not be allocated to the defined regions $R_4$ and $R_5$. These are the defined regions with the two largest data block sizes. At this point, there is greater concern with the limitation of available free storage space. The data which were in the $R_4$ region before can all be moved to the $R_3$ region. For i=9, the following is used $$0 \leq x_j \leq R_{j+1} * r * r \text{ for } j=1$$

$$R_{j+1} * r < x_j \leq R_{j+1} * r * r \text{ for } j=2$$

$$x_j > R_{j+1} * r \text{ for } j=3$$

When i=10, the data will not be allocated to the regions $R_3$, $R_4$ and $R_5$ as now there is even greater concern with the increasing lack of available free storage space. The data which were in the $R_3$ region before can all be moved to the $R_2$ region. For i=10, $$0 \leq x_j \leq R_{j+1} * r * r * r \text{ for } j=1$$

$$x_j > R_{j+1} * r * r \text{ for } j=2$$

When i≥11, the situation calls for the strategy HT0 as now the only concern is the availability of unallocated free storage space. All incoming data will now only be allocated to defined regions of type $R_1$=4 KB to minimize wasted storage space. The data which was in the $R_2$ region before can all be moved to the $R_1$ region.
For i≥11, $$x_j > 0 \text{ for } j=1$$

RESULTS

The OSDFS was evaluated using different kinds of workloads such as INS, RES, WEB, and NT workloads, as described in the publication "A comparison of file system workloads", D. Roselli et al., In Proceedings of the 2000 USENIX Technical Conference, pages 41-54, 2000 as well as a ScientificWorkload described in the publication "obfs: A file system for object-based storage devices", F. Wang et al., In Proceedings of 21$^{st}$ IEEE/12$^{th}$ NASA Goddard Conference on Mass Storage Systems and Technologies, 2004. The performance of the OSDFS was compared with Linux ext2 and ext3 for random writes and reads. The comparison was performed based on random write and read requests instead of sequential write and read requests because data forwarded to the file system are mostly random. The OSDFS was run at the user-level and used SCSI commands to read or write data directly to the disk, while ext2 and ext3 were run at the kernel level, making use of the virtual file system (VFS) layer. The VFS is an abstraction layer in the Linux operating system (OS). The VFS specifies an interface between the kernel and a file system. Therefore it may be easy to add new file systems to the kernel by fulfilling the contract. The workloads were injected to the ext2 and ext3 file system using input/output (I/O) meter. The I/O meter is an open source software that can be used to measure the I/O of a hard disk or network. The I/O meter can be used to generate specific workloads, send the respective workload to the hard disk and monitor the performance of the hard disk thereafter. In order to have fair comparison, the drive was mounted using -o sync parameters, which is similar to the method described in the publication "obfs: A file system for object-based storage devices", F. Wang et al., In Proceedings of 21$^{st}$ IEEE/12$^{th}$ NASA Goddard Conference on Mass Storage Systems and Technologies, 2004, so that the data could write synchronously to the disk.

Figure 11:
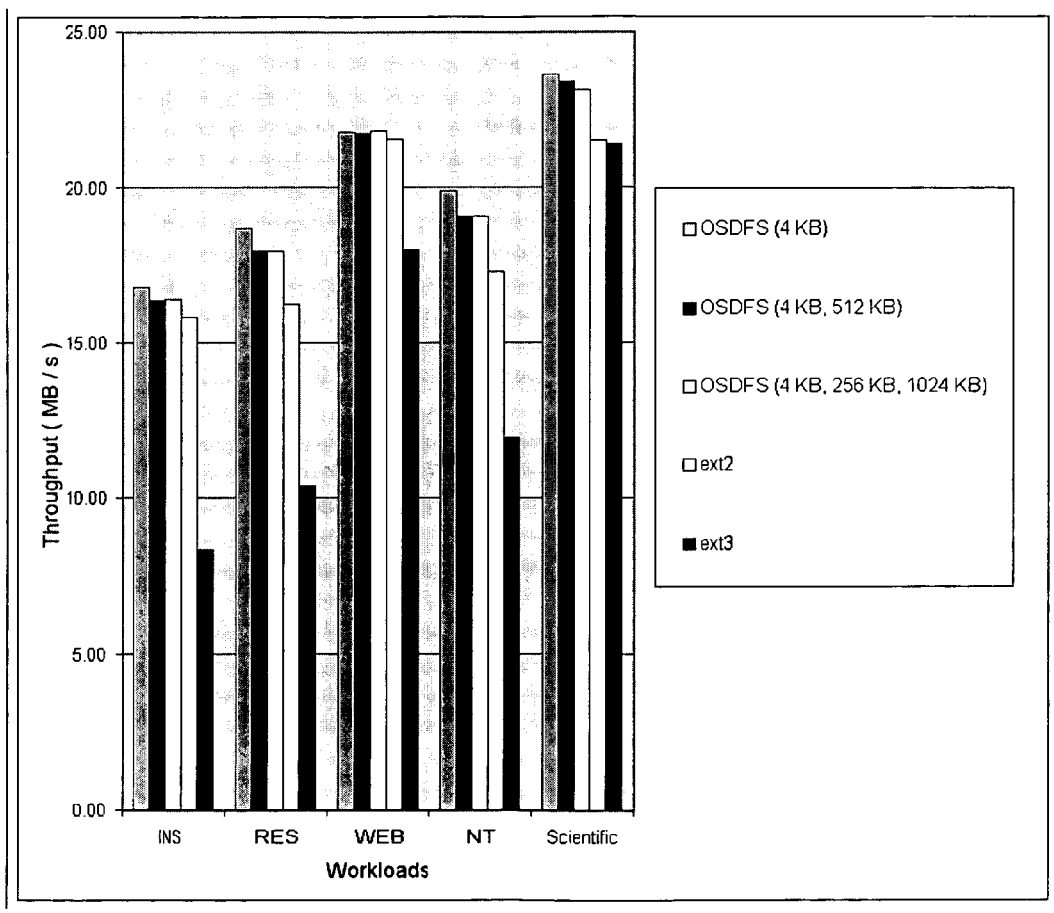
FIG. 11 shows performance of WRITE Request in terms of throughput dealing with different kinds of workloads according to an embodiment of the present invention.

FIG. 11 shows performance of WRITE Request in terms of throughput dealing with different kinds of workloads according to an embodiment of the present invention. The throughput of WRITE operations of ext2, ext3 and different variable sizes of blocks of OSDFS which include 4 KB region, 4 KB and 512 KB regions, and 4 KB, 256 KB and 1 MB regions are shown. As can be seen, the OSDFS delivered a much better performance than ext2 and ext3 regardless of the workloads encountered.

Figure 12:
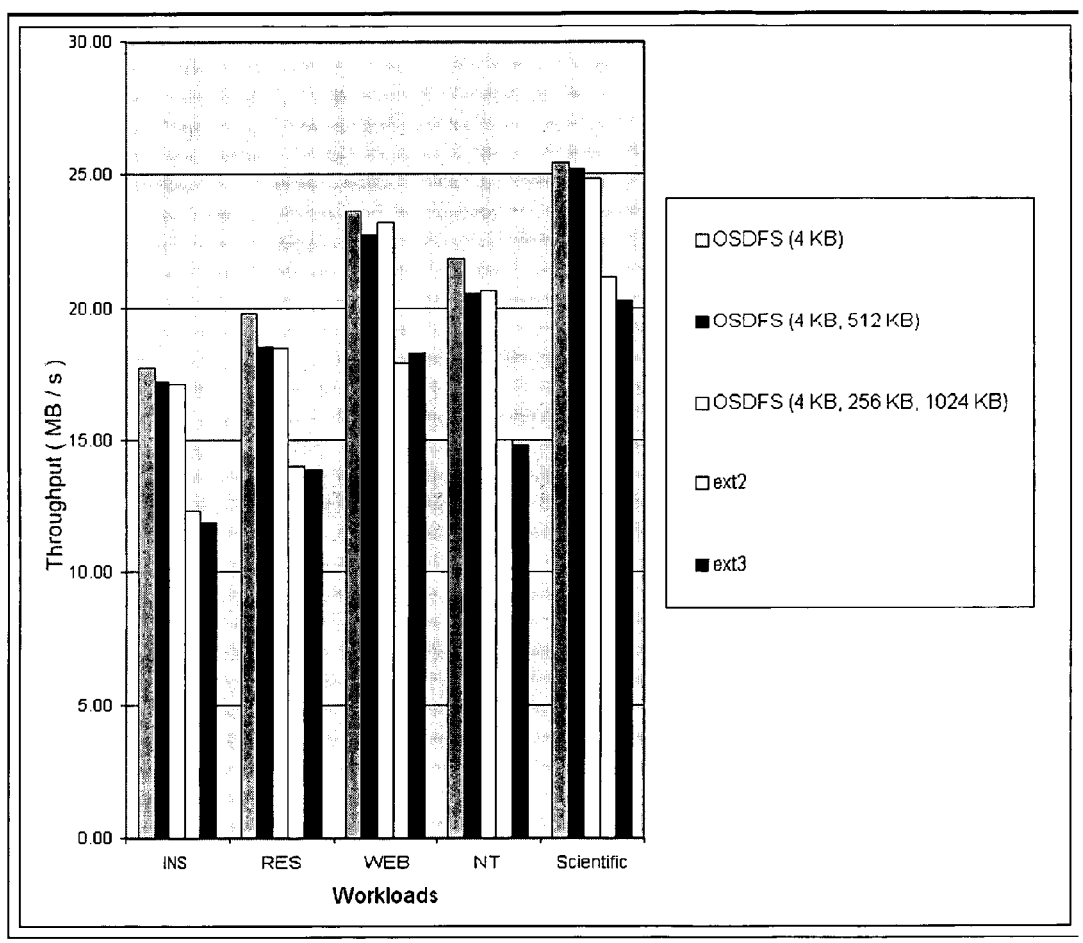
FIG. 12 shows performance of READ Request in terms of throughput dealing with different kinds of workloads according to an embodiment of the present invention.

FIG. 12 shows performance of READ Request in terms of throughput dealing with different kinds of workloads according to an embodiment of the present invention. The throughput of READ operations of ext2, ext3 and different variable sizes of blocks of OSDFS which include 4 KB region, 4 KB and 512 KB regions, and 4 KB, 256 KB and 1 MB regions are shown. In comparison, the OSDFS delivered a much better performance than ext2 and ext3 regardless of the workloads encountered. It can be seen that the read performance of the OSDFS is improved as compared to ext2 and ext3. This is because the location of an object is calculated instead of requiring the metadata to be loaded from the onode table and perform a seek to the data area. Even with the different sizes of blocks, the OSDFS can still deliver the similar throughput for the storage system. This is because the OSDFS utilizes extents in allocating free spaces for the data.

FIG. 13 shows different types of region settings for testing performance of the OSDFS according to an embodiment of the present invention. There are five different types of region settings or region configurations shown, but it will be understood that the region settings and configurations are not so limited. The different types of region settings are 4 KB; 4 KB and 128 KB; 4 KB, 128 KB and 512 KB; 4 KB, 128 KB, 512 KB, 2048 KB; 4 KB, 128 KB, 512 KB, 2048 KB and 8196 KB, but the combinations are not so limited.

Figure 14:
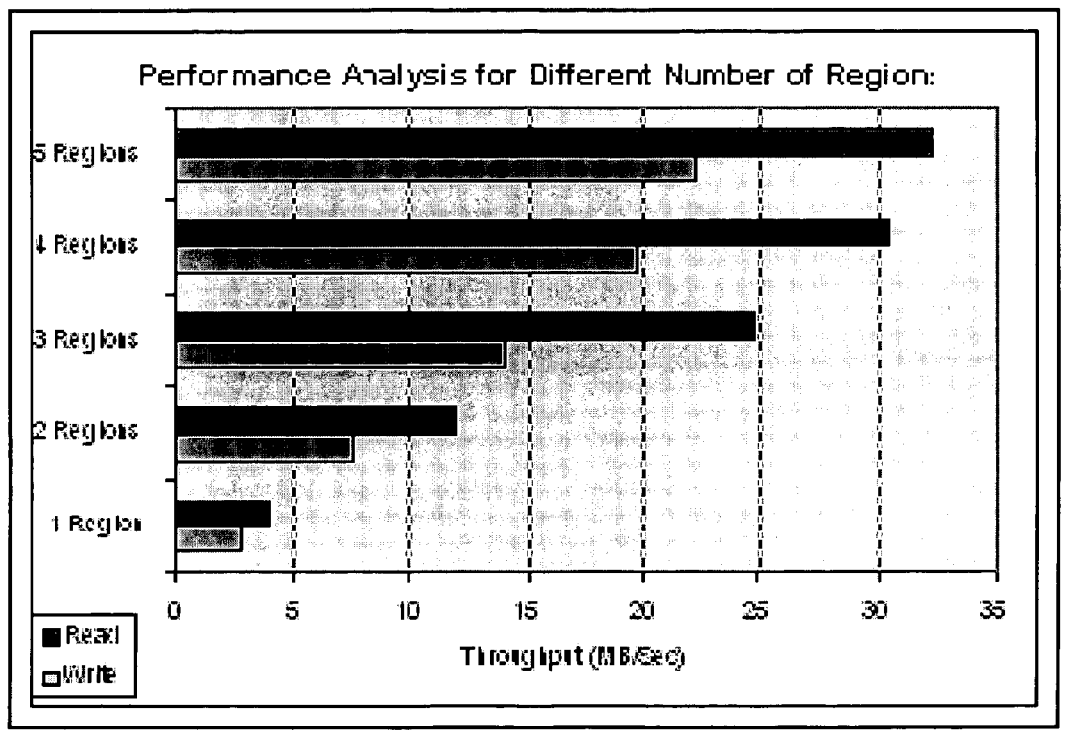
FIG. 14 shows performance analysis for different number of region settings according to an embodiment of the present invention.

FIG. 14 shows performance analysis for different number of region settings according to an embodiment of the present invention. For all the different types of region settings, the read performances are better than the write performances. In addition, the larger the number of regions used for the OSDFS, the better the performance.

Figure 15:
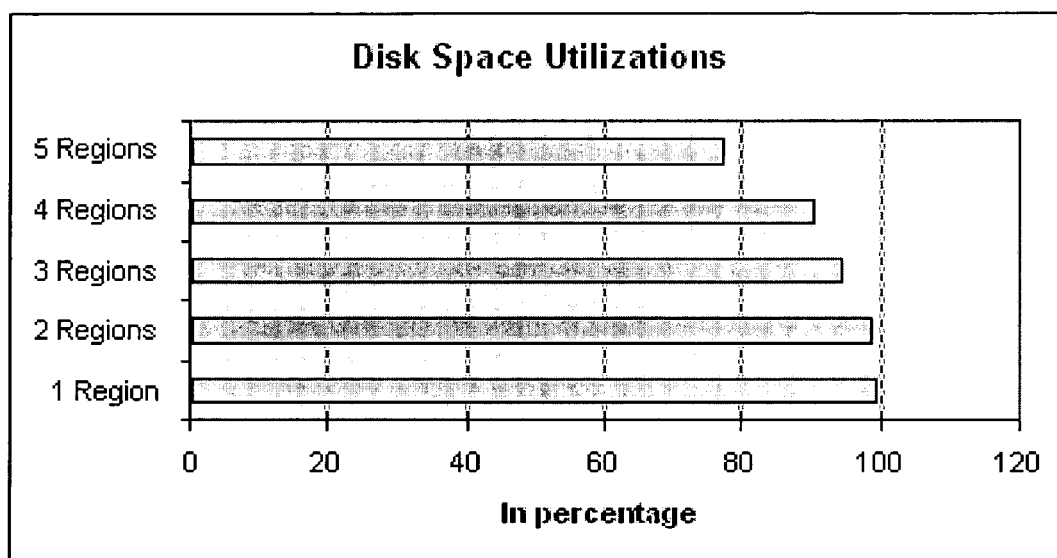
FIG. 15 shows disk space utilizations for different region settings according to an embodiment of the present invention.

FIG. 15 shows disk space utilizations for different region settings according to an embodiment of the present invention. It can be seen from FIG. 15 that the larger the unit size of a region, the smaller the disk space utilization.

Figure 16:
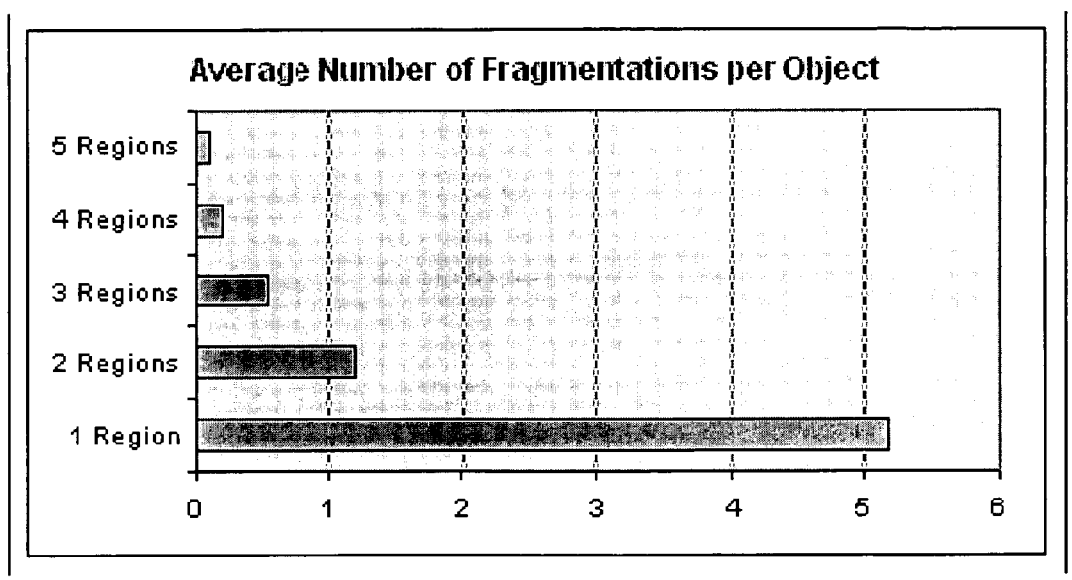
FIG. 16 shows an average fragmentation per object according to an embodiment of the present invention.

FIG. 16 shows an average fragmentation per object according to an embodiment of the present invention. It can be seen from FIG. 16 that with five regions, the average fragmentation per object is the smallest while the value is the largest with only one region. This may be one of the reasons why the performance for a setting of five regions is better than that with only one region under the workload.

The above description of the various embodiments has been presented for purposes of illustration and description. It is not intended to be exhaustive or to limit the invention to the precise form disclosed, and many modifications and variations are possible in light of the disclosed teaching. It is intended that the scope of the invention be defined by the claims appended hereto.

What is claimed is:
1. A computer storage device comprising:
  a processor including:
  a first storage region, configured to store one or more storage blocks of data;
  a second storage region, configured to store one or more storage blocks of data and being different from the first storage region; and a first data structure representing free space in each of the first and second storage regions, the first data structure comprising a location and a length of a block of free space in the respective storage region,
wherein a size of at least one storage block in the first storage region is different from a size of at least one storage block in the second storage region;
a file system is configured to use an adaptive algorithm to allocate storage in the file system;
wherein according to the adaptive algorithm:
a size of a file to be written is determined based on a write request;
a current performance parameter of the file system is determined based on system throughput and/or storage space utilization of the computer storage device;
a storage region type of a plurality of predetermined storage region types which is to be used to store data is determined, wherein the determined storage region type is selected according to the size of the file and the current performance parameter;
a storage region of a plurality of storage regions of the file system is determined, the determined storage region being associated with the determined storage region type, wherein the determined storage region type determines the size of data storage blocks in the determined storage region;
free space is located within the determined storage region; and
data is written from the file to the free space.

2. The computer storage device of claim 1,
wherein the first data structure comprises an array
in which odd-numbered entries in the array contain the location of a block of free space in the storage region and
in which even-numbered entries in the array contain the length of a block of free space in the storage region.

3. The computer storage device-of claim 1,
wherein the first data structure is an extent-based bitmap.

4. A computer storage device comprising:
a first storage region, configured to store one or more storage blocks of data;
a processor including:
a second storage region, configured to store one or more storage blocks of data and being different from the first storage region; and
a first data structure representing a variable-sized file stored in each of the first and second storage regions, the first data structure comprising embedded metadata for searching the respective storage region,
wherein the embedded metadata comprises a size of the file stored in the respective storage region and a storage region type that the file reside in,
and wherein a size of at least one storage block in the first storage region is different from a size of at least one storage block in the second storage region;
a file system is configured to use an adaptive algorithm to allocate storage in the file system;
wherein according to the adaptive algorithm:
a size of a file to be written is determined based on a write request;
a current performance parameter of the file system is determined based on system throughput and/or storage space utilization of the computer storage device;
a storage region type of a plurality of predetermined storage region types which is to be used to store data is determined, wherein the determined storage region type is selected according to the size of the file and the current performance parameter;
a storage region of a plurality of storage regions of the file system is determined, the determined storage region being associated with the determined storage region type, wherein the determined storage region type determines the size of data storage blocks in the determined storage region;
free space is located within the determined storage region; and
data is written from the file to the free space.

5. The computer storage device of claim 4,
wherein the embedded metadata further comprises an identifier for a storage region and a location of a block of free space in the storage region.

6. The computer storage device of claim 4,
wherein the storage region type determines the size of data storage blocks in the storage region.

7. The computer storage device of claim 6,
wherein the size of the data storage blocks in any storage region are selected from a predetermined group of block sizes and different region types have different sizes of data storage blocks.

8. The computer storage device of claim 4,
further comprising a second data structure representing free space in the storage region, the second data structure comprising a location and a length of a block of free space in the storage region.

9. The computer storage device of claim 1,
a second data structure which represents a variable-sized file stored in each of the first and second storage regions and allows configuration of the size of each data storage block in the respective storage region, the second data structure comprising embedded metadata for searching the respective storage region,
wherein the embedded metadata comprises a size of the file stored in the respective storage region and a storage region type that the file reside in.

10. The computer storage device of claim 1, comprising one or more files, wherein each file comprises one or more storage blocks in the first storage region or the second storage region, the selection of the one or more blocks for each file being made in order to optimize performance of the file system.

11. The computer storage device of claim 4, comprising one or more files, wherein each file comprises one or more storage blocks in the first storage region or the second storage region, the selection of the one or more blocks for each file being made in order to optimize performance of the file system.

12. A method of adaptively allocating storage in a computer storage device file system, wherein the file system comprises a plurality of storage regions which are configured to store data, the method comprising the steps of:
determining a size of a file to be written based on a write request;
determining a current performance parameter of the file system based on system throughput and/or storage space utilization of the computer storage device;
determining a storage region type of a plurality of predetermined storage region types which is to be used to store data, the determined storage region type selected according to the size of the file and the current performance parameter;
determining a storage region of the plurality of storage regions, the determined storage region being associated with the determined storage region type, wherein the determined storage region type determines the size of data storage blocks in the determined storage region;

locating free space within the determined storage region; and writing data from the file to the free space, moving data that has been stored in a first storage region of the plurality of storage regions with a first data storage block size to a second storage region of the plurality of storage regions with a second data storage block size in order to achieve better space utilization if the current performance parameter reaches a predetermined value, wherein the first data storage block size is larger than the second data storage block size, wherein the performance parameter comprises a parameter selected to optimize throughput or a parameter selected to optimize space utilization.

13. A method of adaptively allocating storage in a computer storage device file system, wherein the file system comprises a plurality of storage regions which are configured to store data, the method comprising:

determining a size of a file to be written based on a write request;

determining a current performance parameter of the file system based on system throughput and/or storage space utilization of the computer storage device;

determining a storage region type of a plurality of predetermined storage region types which is to be used to store data, the determined storage region type selected according to the size of the file and the current performance parameter;

determining a storage region of the plurality of storage regions, the determined storage region being associated with the determined storage region type, wherein the determined storage region type determines the size of data storage blocks in the determined storage region;

locating free space within the determined storage region; and writing data from the file to the free space, moving data that has been stored in a first storage region of the plurality of storage regions with a first data storage block size to a second storage region of the plurality of storage regions with a second data storage block size in order to achieve better space utilization if the current performance parameter reaches a predetermined value, wherein the first data storage block size is larger than the second data storage block size.

* * * * *